Sept. 6, 1966

H. J. TIMMER ETAL 3,271,077

TRUCK SUSPENSION SYSTEM

Filed July 13, 1964

INVENTOR.
HILLIS J. TIMMER
NORMAN P. UNEMA
BY
Price & Heneveld
ATTORNEYS

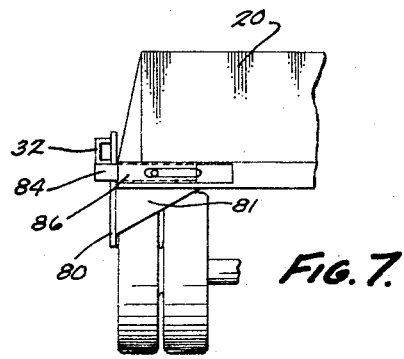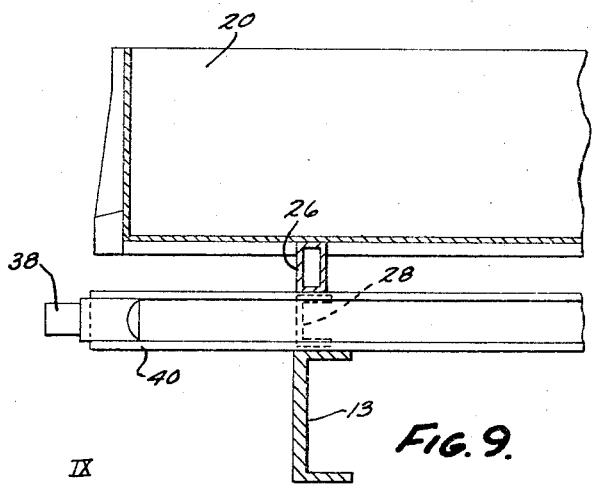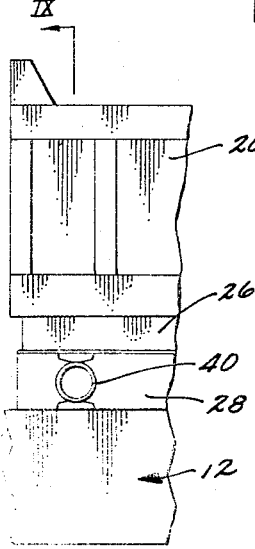

Sept. 6, 1966  H. J. TIMMER ETAL  3,271,077
TRUCK SUSPENSION SYSTEM

Filed July 13, 1964  4 Sheets-Sheet 4

INVENTOR.
HILLIS J. TIMMER
NORMAN P. UNEMA
BY
ATTORNEYS

United States Patent Office 3,271,077
Patented Sept. 6, 1966

3,271,077
TRUCK SUSPENSION SYSTEM
Hillis J. Timmer, 2150 Marlacoba Drive, Holland, Mich., and Norman P. Unema, 3281 Oak St., Hudsonville, Mich.
Filed July 13, 1964, Ser. No. 381,967
5 Claims. (Cl. 298—22)

This invention relates to trucks and more particularly to a truck suspension system enabling load redistribution control on axles.

State laws commonly set maximum per-axle loading for trucks, to minimize highway deterioration. Trucks regularly affected include dump trucks and liquid tank trucks, both capable of carrying very heavy loads, but concentrated largely on the rear axle assembly. The use of axle assemblies in addition to the normal front and rear axle assemblies has been conceived heretofore, for redistribution of the load from the rear axle. However, since state laws also control axle loading according to a minimum distance between axles, the additional axle assemblies, to be effective, must ordinarily involve complex and expensive structure. Rather than do this, typical dump trucks and the like normally simply limit their pay load and use conventonal equipment. This limitation is a definite economic handicap of course, especially during the spring thaw season in northern States when severe load limits are rigidly enforced.

It is an object of this invention to provide a truck assembly enabling per-axle loading redistribution in a unique manner allowing a substantial increase in the pay load of the vehicle, while still meeting state law requirements, and yet by the use of a relatively simple, but extremely effective load redistribution apparatus.

Another object of this invention is to provide a tandem-type redistribution apparatus for trucks enabling controlled weight distribution off the rear axle and onto the front axle and a special tandem axle assembly, generally in proportion to the load applied. Further, the redistribution equipment enables the load to be resiliently supported to accommodate road irregularities, even without heavy spring equipment on the tandem attachment.

Another object of this invention is to provide a tandem load redistribution apparatus in one form uniquely suitable for cooperation with mechanisms on dump trucks. The redistribution apparatus utilizes the conventional dump box itself for load distribution. Moreover, it utilizes the dump box to hoist the tandem apparatus from engagement with the road when it is not needed, i.e. when the truck is empty. Further, the dump box, when elevated, serves to automatically place the tandem apparatus into a non-interfering position allowing clean dumping. Moreover, the unit is removable from the truck so that it can be used, for example, in the spring thaw season, and is detachable for the remainder of the year, if desired.

These and several other objects of this invention will become apparent upon studying the following specification in conjunction with the drawings in which:

FIG. 7 is a fragmentary, elevational, rear view of the elevating supports for the tandem frame;

FIG. 8 is an enlarged, side, fragmentary view of the pivotal connector between the truck frame and the front end of the tandem frame;

FIG. 9 is a sectional view taken on IX—IX of FIG. 8;

*First form*

Figure 1:
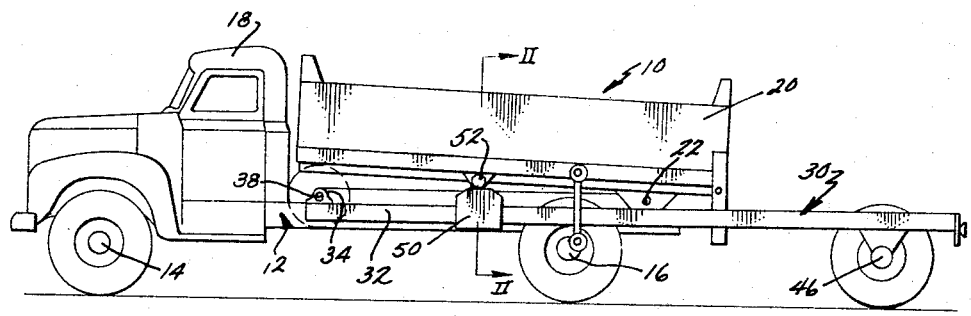
FIG. 1 is a side elevational view of the complete truck assembly as a first form of the invention.

Referring now specifically to the drawings, the complete truck assembly 10 shown as the first form of the invention comprises a truck including a main elongated frame 12 with a front axle assembly 14 mounted conventionally under the front end thereof, a rear axle assembly 16 mounted conventionally under the rear end of the frame, a body 18 mounted on the front end of the frame and including a hood enclosing a typical power plant drive assembly (not shown).

Figure 2:
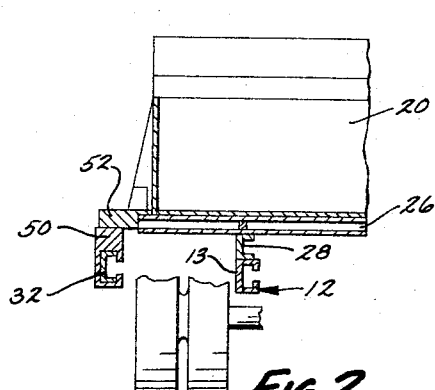
FIG. 2 is a fragmentary sectional view taken on plane II—II of FIG. 1.
Figure 3:
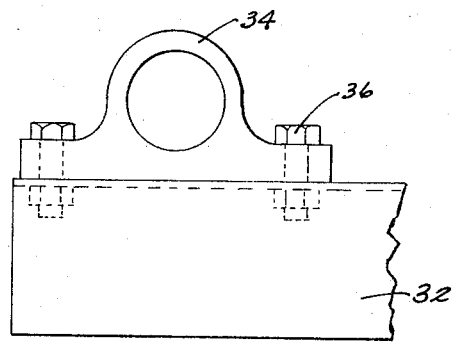
FIG. 3 is an enlarged, fragmentary, elevational view of the connection between the tandem axle assembly and the truck frame of the assembly in FIG. 1.

In this first form of the invention, the load carrying mechanism includes a conventional dump box 20 mounted on a rear pivot axis 22 to frame 12. The main frame 12 of the truck comprises basically C-shaped or channel elements 13 of conventional type. Box 20 is mounted on a dump box frame 26 (FIG. 2). Between frame 12 and dump box frame 26 is sub-frame 28. Frame 26 is shown as a separate component, but alternately can be an integral part of main frame 12. These frames are formed of spaced channels on opposite sides of the truck interconnected by cross beams.

Straddling this conventional truck frame is an elongated tandem frame 30 formed of a pair of oppositely positioned channel elements 32 (FIG. 2). These extend from a position rearwardly of the truck to a position intermediate the front and rear axle assemblies 14 and 16. Thus, the forward end of the tandem frame, and more specifically, the forward ends of the two arms 32, are pivotally mounted to the truck frame by a pair of pillow blocks 34 secured by bolts 36 to arms 32. The rearwardly extending tandem frame assembly, therefore, is free to pivot upwardly and downwardly around this pivot mount axis.

These spaced pillow blocks 34 are each mounted on cylindrical stub shaft journals 38 (FIG. 9). These extend from the opposite ends of a transverse support sleeve 40 extending across the truck through sub-frame 28 between box frame 26 and main frame 12. Instead of this continuous transverse support, it is conceivable that a pair of simple stub shafts, each anchored to the frame can be employed on opposite sides of the truck to mount the forward ends of beams 32. The rear ends of the beams are interconnected. The tandem frame is mounted at its rear end to a tandem axle assembly 46 positioned rearwardly a substantial distance of the entire truck.

Intermediate the ends of the tandem frame is a pair of slidable support blocks 50 on opposite sides of the truck. These are capable of moving forwardly and rearwardly on beams 32. When these blocks are in the intermediate position shown in FIG. 1, they operably engage laterally, outwardly extending cylindrical projections 52 mounted to the bottom of box 20 intermediate its forward and rear ends. Thus, instead of the front end of the box lowering to contact the truck frame, it only lowers on its pivot axis 22 until projections 52 contact blocks 50. This applies a substantial portion of the box load to the blocks and therefore, to beams 32 of the tandem frame. The weight applied to this tandem frame applies a substantial load at the forward end of the frame, to impart a greater load to front axle assembly 14. Also, it applies a greater load to tandem axle assembly 46. The proportion of the load applied to the front and tandem axle assemblies is of course removed from rear axle assembly 16, which usually carries the major share of the load. This rear axle is usually critical in its loading when determining axle loading on highways.

The tandem axle assembly, therefore, although extremely simple, effectively redistributes the load in a controlled fashion. By exactly positioning blocks 50 and supports 52, and by determining the length of the beams of the tandem support frame, the amount of redistribution can be accurately controlled during manufacture. The tandem axle assembly is substantially spaced from the rear axle assembly, ten feet or greater, for example, to readily meet state requirements for axle loading.

Figure 5:
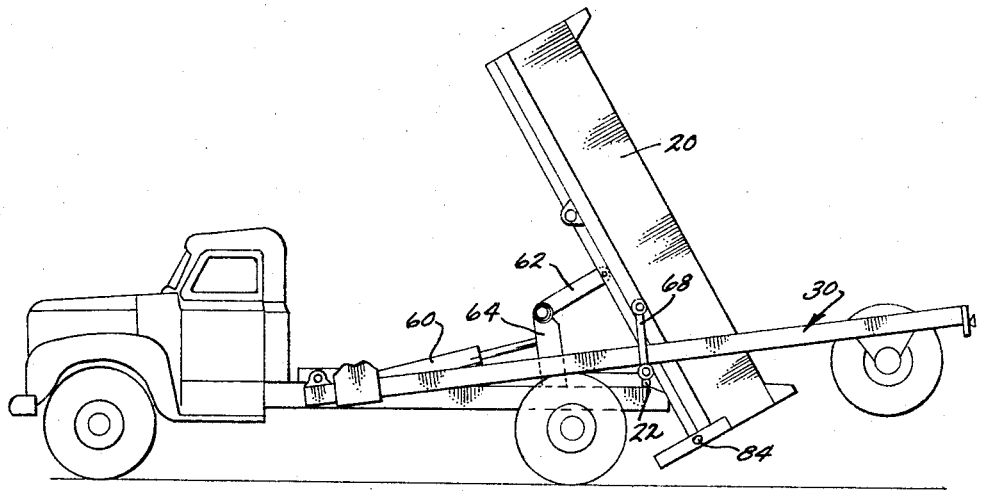
FIG. 5 is a side elevational view of the apparatus in FIGS. 1 and 4, showing the dump truck being unloaded.

When utilizing this tandem assembly with a dump truck, it is desirable to elevate the tandem axle assembly to a non-interfering position when the load is dumped from the box. Thus, referring to FIG. 5, when box 20 is elevated on its pivot axis 22 by the conventional hoist mechanism utilizing a power fluid cylinder 60 and interconnected links 62 and 64, the tandem frame assembly 30 is automatically elevated to the position illustrated. This not only allows the dirt to freely flow out of the box, but also enables the truck to drive away without having to pull the tandem axle assembly through the pile. This is achieved by utilizing a pair of depending suspension arms 68 on opposite sides of the truck.

Figure 6:
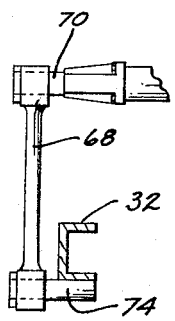
FIG. 6 is a sectional, fragmentary, enlarged view of the tandem frame hoist, shown in operation during dumping in FIG. 5.

These arms (as illustrated in FIG. 6) are pivotally mounted on a pair of respective stub shafts 70 extending from opposite sides of the dump truck box. Each arm extends down beneath the respective individual beam 32 of the tandem frame. A laterally extending lift pin 74 is held on the bottom of each of arms 68. Consequently, as the dump box is hoisted, the arms hoist the tandem frame assembly a controlled amount because they are pivotally mounted to the dump box forwardly of pivot axis 22. When not in use, these arms merely suspend freely in the positions illustrated in FIG. 1 or FIG. 4, depending upon the condition of the tandem axle assembly.

Figure 4:
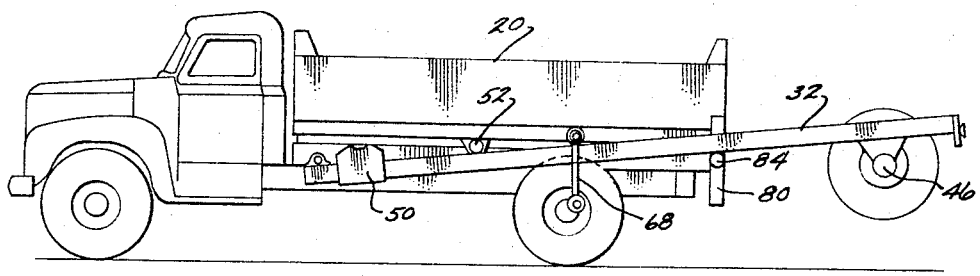
FIG. 4 is a side elevational view of the apparatus in FIG. 1, shown in the unloaded position and the tandem unit hoisted.

When the box is not being dumped, but is unloaded, it is often desirable to elevate the tandem assembly to a position out of contact with the ground. This prevents the assembly from bounding unduly when hitting rough spots in the road. To enable this, blocks 50 are slidable along beams 32, as illustrated in FIG. 4, to a forward position enabling box 20 to be completely lowered since projections 52 do not abut blocks 50. Therefore, load is not applied to the tandem frame. To hoist the unloaded tandem frame, a pair of laterally projecting pins 84 (FIG. 7) are slidable in sleeves 86. These extend from opposite sides of the truck to be shiftable to an inner inactive position or an outer, extended, active position. In the inner position, they are not in the same plane as beams 32 and therefore, do not contact them. However, in the outer position, these pins project beneath beams 32 so that, upon complete lowering of dump box 20, these pins abut beams 32 to raise them and the entire tandem axle assembly 46 on its front axis to the elevated position illustrated in FIG. 4. This is because the pins are to the rear of dump box pivot axis 22 to rise as the forward end of the dump box lowers. Consequently, when the dump truck is lowered, assuming the pins have been manually shifted, the tandem assembly is elevated to an inactive position, and is held securely from upward or downward motion by being secured between pins 84 and projections 52. The added structure is lightweight, comprising only a basic structural framework and a wheel assembly. Therefore, it is readily hoisted.

Also, a pair of downwardly extending, vertical plates 80 with reinforcing braces 81 (FIG. 7) are provided along the inner edges of the respective beams 32. These prevent any side sway of the extended frame 30 that would cause rubbing of channels 32 on the rear axle wheels or tires. These also minimize lateral stress on pivot pins or stub shafts 38.

The interfitting components of this assembly in effect provide their own accommodating resiliency under load as rough terrain is encountered. Specifically, as bumps are encountered, the box will shift up and down small amounts with relatively large wheel vertical gyrations to create a self-regulating or dampening action. Vertical motion of the trailer due to irregularities in the road are transmitted back to the load which acts as a spring and maintains a virtually constant load on the trailer. Hence, the spring assembly for the tandem axle, if used, need only be minimal. It will also be noted that the load applied to the trailer or tandem assembly is proportional to the pay load, giving an automatically controlled redistribution effect.

Second form

Figure 10:
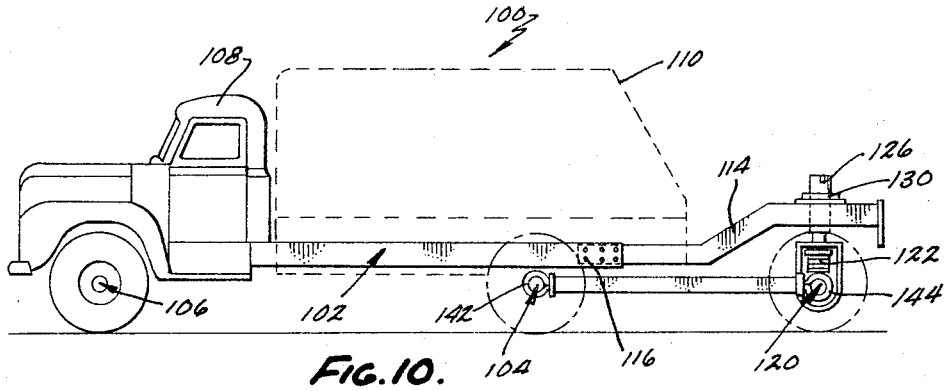
FIG. 10 is a side elevational view of a truck assembly showing the second form of this invention.
Figure 11:
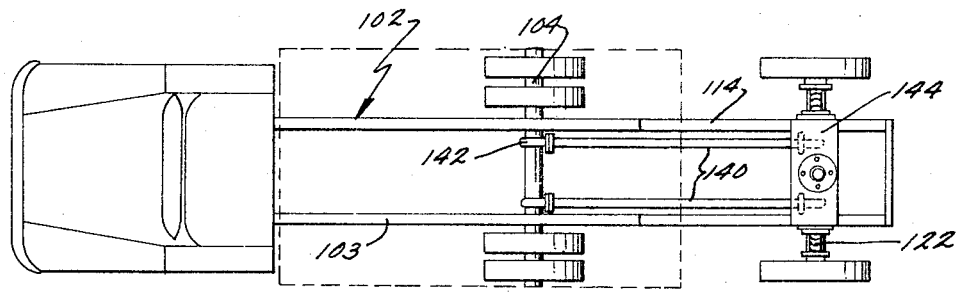
FIG. 11 is a plan view of the second form of the apparatus in FIG. 10.
Figure 12:
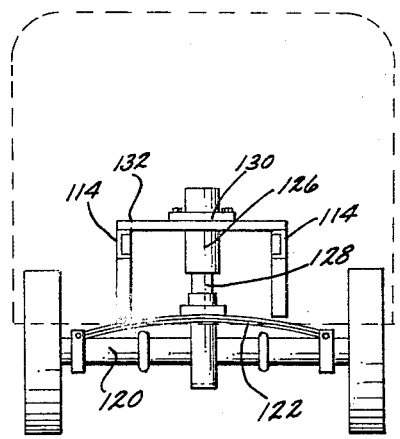
FIG. 12 is a rear elevational view of the apparatus in FIGS. 10 and 11.

While the first form of the invention is particularly advantageous and uniquely cooperative with a dump type truck, the second form of the invention illustrated in FIGS. 10 through 12 may be utilized on other load carrying trucks.

In this form of the invention, the complete truck assembly 100 includes an elongated truck framework 102. It includes a pair of spaced channel elements mounted on rear axle assembly 104 and front axle assembly 106. The truck body 108 is secured on the frame and encloses a drive train including an engine.

The load container 110 is illustrated in dotted lines. It may be any of several different types, including a box, a rack, a liquid tank, and so forth. It is particularly advantageous for bulk liquid vehicles, due to the heavy loads normally encountered therewith. With this type of vehicle, the major loading is usually applied to the rear axle assembly 104. To controllably redistribute the load, extended framework 114 is attached to the truck framework. This extended framework incorporates a pair of spaced, extending channel elements slidably and telescopically interengaged with the truck framework channel elements 103 in frame 102. It is secured rigidly thereto by rivets 116. These also may be secured by removable pins, if desired, so long as the connection integrates the framework in a manner allowing a hoisting action on the rear of frame 114 to be applied directly to frame 102.

Suspended beneath the rear end of special tandem frame 114 is a third tandem axle assembly 120. This axle assembly is not rigidly attached to framework 114 as are the front and rear axle assemblies. Rather, mounted between the resilient spring assembly 122 on axle assembly 120 is a fluid cylinder 126 which has a rod 128 extensible therefrom. The rod is oriented downwardly. The upper end of the cylinder is mounted by plate 130 to cross member 132 between channel elements 114. Extension of the fluid cylinder therefore tends to lift frame chanels 114 and thus the entire truck framework from the rear. This applies a downward thrust on tandem axle assembly 120, and on front axle assembly 106.

The tandem and rear axle assemblies are interconnected by a pair of draw bars 140, each having collars 142 and 144 at the front and rear ends thereof around the respective axles to maintain constant spacing between them.

In operation, therefore, to redistribute the load from rear axle assembly 104, cylinder 126 is extended to hoist the rear end of the truck frame. This applies downward thrust on the tandem axle assembly, and the front axle assembly. The amount of extension of the cylinder controls the amount of redistribution so that this can be accurately varied. Preferably, the fluid cylinder has three general positions, full extension, full contraction, and partial extension. During full extension, or closely thereto, the load is redistributed. During partial extension, no load is applied to the tandem axle assembly, but is allowed to engage and ride along the ground. During full contraction, the rear axle assembly is actually hoisted off the ground to travel in an elevated inactive position, preventing side skidding of the mechanism. In order to elevate the mechanism, the interengagement between beams 103 and 114 must be capable of accepting a downward thrust as well as an upward thrust on the rear end of the truck channels.

It will be understood that each of the two forms of the invention has its own particular advantages and usage, although both have certain operational and conceptual principles in common. It is conceivable that certain other various modifications might be made of the novel device, utilizing the principles taught herein, within the broader aspects of this invention. The invention is, therefore, not to be limited to the preferred embodiments shown, but only by the scope of the appended claims and the reasonably equivalent structures to those defined therein.

We claim:

1. A truck assembly comprising: front and rear axle assemblies; a frame supported on said axle assemblies; said frame forming a load bed generally over said rear axle assembly; a dump box pivotally mounted on the rear of said frame; a third tandem axle assembly displaced to the rear of said load bed; a tandem frame extension extending from said truck frame rearwardly to said tandem axle assembly; the rear of said tandem frame extension being supported by said tandem axle assembly; the forward end of said extension being pivotally mounted on said truck frame, and said extension intermediate its ends being in supporting engagement beneath said dump box to allow distribution of part of the load normally applied to the rear axle assembly to the front and tandem axle assemblies.

2. In combination on a dump truck having a truck frame; front and rear axle assemblies; a dump box pivotally mounted toward the rear thereof to said frame, and powered dump box elevating means between said frame and the dump box forwardly of the pivotal mount; an elongated load redistribution tandem assembly including an elongated rigid support frame pivotally attached at its forward end to said truck frame between said axle assemblies; a third tanden axle assembly operably beneath the rear of said support frame, rearwardly of said rear axle assembly; and said dump box forwardly of its pivotal mounting being in supporting engagement on said support frame intermediate the ends of said support frame to redistribute a portion of the load from said rear axle assembly to said front and tandem axle assemblies.

3. The dump truck in claim 2 wherein said engagement is formed between rigid portions on said box and fore-to-rear movable support blocks on said support frame.

4. In combination on a dump truck: a truck frame; front and rear axle assemblies under said frame; a dump box pivotally mounted towards its rear to said frame, and powered dump box elevating means beneath said dump box; an elongated load redistribution tandem assembly comprising an elongated rigid support frame pivotally attached at its forward end to said truck frame between said axle assemblies, and a third tandem axle assembly operably beneath the rear of said support frame rearwardly of said rear axle assembly; said dump box, forwardly of its pivotal mounting, being in supporting engagement on said support frame intermediate the ends of said support frame to redistribute load on said rear axle assembly to said front and tandem axle assemblies; elevating means on said dump box for said support frame comprising a pair of depending lift arms attached at the upper ends thereof to said box, forwardly of said dump box pivotal mounting, and including portions extensible beneath said support frame intermediate the ends thereof, to lift said support frame and tandem axle assembly with elevation of said dump box.

5. In combination on a dump truck: a truck frame; front and rear axle assemblies thereunder; a dump box pivotally mounted near its rear end to said frame; powered dump box elevating means; a load distribution assembly comprising an elongated rigid support frame pivotally attached at its forward end to opposite sides of said truck frame between said axle assemblies, and a third tandem axle assembly operably beneath the rear of said support frame rearwardly of said rear axle assembly; support block means on said truck frame beneath and in supporting engagement with said box, to redistribute load thereon, said block means being shiftable on said truck frame to a position out of engagemennt with said box; and lift means for said support frame and third axle assembly mounted to said box rearwardly of its pivotal mounting and including portions movable beneath said support frame to hoist it by the rising rear end of the dump box as the forward end of said box is lowered from a dump position.

References Cited by the Examiner

UNITED STATES PATENTS

| 2,883,237 | 4/1959 | Schonrock | 298—17 |
| 2,974,976 | 3/1961 | Lyall | 180—22 |
| 3,161,418 | 12/1964 | Brennan | 280—81 |
| 3,191,963 | 6/1965 | Prichard | 280—81 |

BENJAMIN HERSH, *Primary Examiner.*

R. J. JOHNSON, *Assistant Examiner.*